United States Patent [19]
Mc Kenzie

[11] Patent Number: 4,909,641
[45] Date of Patent: Mar. 20, 1990

[54] BEARING WITH EXPANDED LOAD ZONE

[75] Inventor: Myron R. Mc Kenzie, Torrington, Conn.

[73] Assignee: The Torrington Company, Torrington, Conn.

[21] Appl. No.: 236,399

[22] Filed: Aug. 25, 1988

[51] Int. Cl.[4] .................. F16C 27/06; F16C 33/64
[52] U.S. Cl. ................................ 384/536; 384/447; 384/513
[58] Field of Search ............. 384/447, 513, 516, 535, 384/536, 569, 581, 582, 626, 490

[56] References Cited

U.S. PATENT DOCUMENTS

| 2,983,029 | 5/1961 | Perin et al. | 384/564 X |
| 3,321,256 | 5/1967 | Orain | 384/447 |
| 3,890,854 | 6/1975 | Pitner | 384/582 X |
| 4,067,626 | 1/1978 | McElwain | 384/582 |

FOREIGN PATENT DOCUMENTS

| 1507257 | 12/1967 | France | 384/535 |
| 2426829 | 12/1979 | France | 384/569 |
| 870784 | 10/1981 | U.S.S.R. | 384/535 |
| 2203501 | 10/1988 | United Kingdom | 384/490 |

Primary Examiner—Thomas R. Hannon

[57] ABSTRACT

The bearing has an expanded load zone for better distribution of the load among the rollers, if used, or balls, if used, and allows the bearing to perform better under conditions of misalignment. As an example, the bearing may include a non-rotating ring which has an elastomer of non-uniform thickness bonded to it. The non-uniform thickness of the elastomer will cause a bearing race to go out of round when under load to the point that each roller or ball in approximately 180° of the load zone has the same load, thus reducing maximum rolling element stress. Plastic, lead, alloys, or babbitt materials may be used as an alternative to elastomeric material.

28 Claims, 3 Drawing Sheets

BEARING WITH EXPANDED LOAD ZONE

BACKGROUND OF THE INVENTION

1. Field of the Invention

This invention relates to bearings in general, and in particular to a bearing assembly with yieldable spacer means for controlled deformation of a race with radial bearing load.

2. Description of the Prior Art

A rolling member bearing having concentric inner and outer races in an unloaded state will transfer nearly all of an applied radial load through the one or two rolling members which pass at any moment through the location about the radius through which the bearing load is transferred. This concentration of stress on only a few rolling members at this radial load location is caused by a combination of rolling member play and race deformation. It is a principal factor in wear and galling which affects bearing life.

Spreading the load, that is, applying a portion of the load through rolling members adjacent to those moving through the radial load location reduces the maximum load received by each rolling member. This extends bearing life and upgrades the maximum load support capability for a given bearing.

One arrangement for spreading the load in a bearing assembly in which the load is applied in an established direction defining a predetermined loading zone or radial load location, for example, as in a cam follower, is provided by U.S. Pat. No. 3,321,256 granted to M. Orain, May 23, 1967. It discloses using an elliptical trunnion, or spindle as the non-rotating inner race about which the rolling members and outer race rotate. The major axis of the ellipse is normal to the direction of the loading force.

The outer race is deformed inwardly at the location where it rides on the cam, forcing it to parallel the elliptical surface of the inner race over a small arc distance to either side of the radial load location. Rolling members within the area of deformation that centers on the radial load location are held in simultaneous intimate contact with the now paralleling inner and outer race portions, thereby sharing the load that would otherwise fall on one or two rolling members.

The elliptical shape of the trunnion is provided during manufacture. Alternatively, the shape is provided by machining it as a yielding hollow tube which deforms in response to load transferred back through the rolling members in the area of deformation.

Another arrangement for spreading the load over additional rollers is provided in U.S. Pat. No. 4,067,626 granted to McElwain on Jan. 10, 1978. For a bearing in a universal bearing joint, the bearing cup having an inner bearing surface, which serves as the outer race, is formed in an ellipse. The cylindrical outer surface of the trunnion serves as the inner race. In contrast with U.S. Pat. No. 3,321,256, it is disclosed that the major diameter of the ellipse is formed so that it coincides with the maximum loading point.

In an alternative arrangement, the inner surface of the bearing cup is cylindrical and a sleeve having elliptical inner surface and cylindrical outer surface is inserted between the rollers and the cylindrical inner surface of the bearing cup.

In another alternative arrangement, an insert having a cylindrical inner surface and elliptical outer surface which services as the inner race, is slipped on the cylindrical trunnion.

SUMMARY OF THE INVENTION

Briefly described, the bearing comprises an annular outer race and an annular inner race radially spaced from the outer race to provide an outer race-inner race annulus. One of the races is fixed and the other race is rotatable. Rolling members, such as rollers, or balls, are located in the outer race-inner race annulus. Spacer means are provided which are in contact with the fixed race. The spacer means have less stiffness than the fixed race. The thickness of the spacer as a whole increases with arc distance from the radial bearing load location. This results in a portion of the bearing load on the rolling members at the location of the bearing load being transferred to adjacent rolling members.

The present invention operates well with commonly used rolling members including but not limited to those of the ball and roller variety.

BRIEF DESCRIPTION OF THE DRAWINGS

In order that the invention be more fully comprehended, it will now be described, by way of example, with reference to the accompanying drawings in which.

DESCRIPTION OF THE PREFERRED EMBODIMENTS

Figure 1:
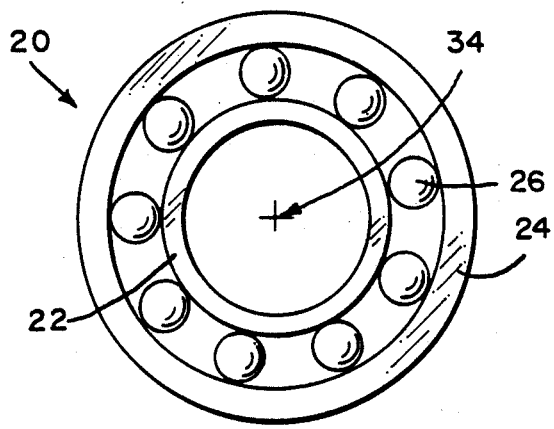
FIG. 1 is a sectional view of a bearing of the type presently in use shown in an unloaded condition.

Referring to the drawings, FIG. 1 shows a bearing 20 in an unloaded state having inner and outer races 22 and 24 respectively, concentric with one another. If the bearing is a ball bearing, the balls are generally in contact with only one or the other race owing to looseness designed in the raceway for travel of the balls. If the bearing is a roller bearing, the rollers may be in like contact with both races if their axes are not in alignment with the axis of the races.

Figure 2:
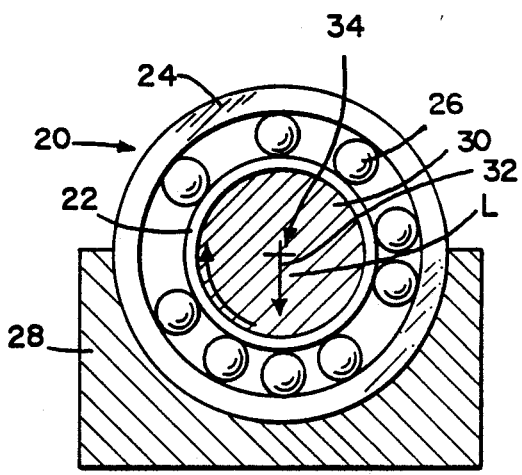
FIG. 2 is a sectional view of a bearing type presently in use shown under load.

FIG. 2 shows the same bearing 20 mounted in a block 28 and supporting rotating shaft 30. The radial bearing load L falls perpendicular to the axis of the bearing along a line in the direction designated by the arrow 32. Inner race 22 is forced in the direction of L toward the outer race until it engages and is supported by the one or two bearing members which fall in its path as it and they are rotating about the rotational axis 34 of the inner race.

Figure 3:
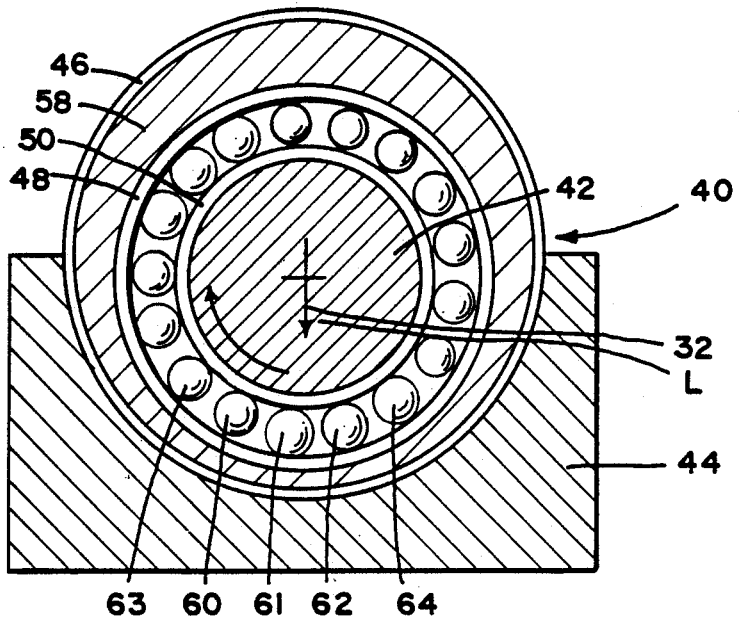
FIG. 3 is a sectional view of a bearing constructed according to the present invention having a rotatable inner race and a stationary outer race.

FIG. 3 shows a bearing 40 mounted on rotating shaft 42 and seated in block 44 wherein ring 46 and annular outer race 48 are stationary and annular inner race 50 rotates with shaft 42. The races and ring may be cast and machined or may be no more than sheet metal in construction. Spacer 58 located in the outer race-ring annulus increases in thickness radially with arc distance from the location of the radial bearing load L. Or to put it another way, the inner and outer races are closest to each other at the location of the radial bearing load indicated by direction arrow 32. Spacer 58 comprises a supportive but yieldable material which has less stiffness than the races. Such material may be an elastomer such as plastic or rubber, a lead alloy, babbit, or other metal, the latter being more suitable for high load applications.

Under load, race 50 is forced down in the direction of L against rolling members 61 or a combination of 60, 61, and 62. The rolling members in turn transfer the load through outer race 48 to yieldable spacer 58 which yields under the pressure so that race 48 deforms radially in the direction of arrow 32. The resulting movement of roller members 60, 61, and 62 in direction 32 allows race 50 to move into contact with members 63 and 64. This displacement of races and rolling members with deformation of the outer race continues until an equilibrium is reached between the force of the load in direction 32 and the resistance to yield owing to the stiffness of spacer 58 as well as race 48.

Preferably, the spacer is secured to the stationary ring 46 and it may also be secured to the outer annular race 48. This keeps the spacer in correct orientation with respect to the radial direction of the load and provides additional stability for the bearing.

It is only necessary that the spacer occupies sufficient arc distance from the location of the radial bearing load to support the load as described earlier. For example, as shown in FIG. 4, it extends to about 45 degrees to each side of the location of the radial bearing load, leaving the space 56 beyond the 90 degree arc distance empty.

Under ideal conditions, rolling members up to 90 degrees from each side of the location of the radial bearing load are engaged by both inner and outer races and are transferring load between the races. The rate of increase in thickness of spacer 58 (see FIG. 3) with arc distance from the location of the radial bearing load is tailored to the stiffness of the bearing materials and operating conditions so as to distort outer race 48 in a manner which would bring as many rolling members as possible into load bearing communication with the inner and outer races.

Figure 4:
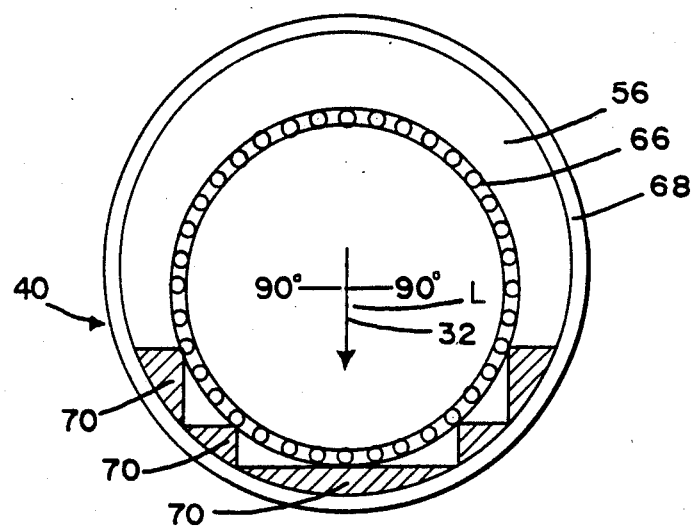
FIG. 4 is a sectional view of the spacer means and rings.

As an alternative to making the spacer continuous, it can be constructed, as shown in FIG. 4, of individual supports 70 so that the thickness of the spacer as a whole increases with arc distance from the location of the radial bearing load. For additional deformation control, the varying thickness spacer is made from materials which vary in stiffness over the distance from the location of the radial bearing load. For example, this is accomplished by blending materials having different stiffness into the construction of the spacer so that stiffness gradually changes over the arc distance.

Figure 5:
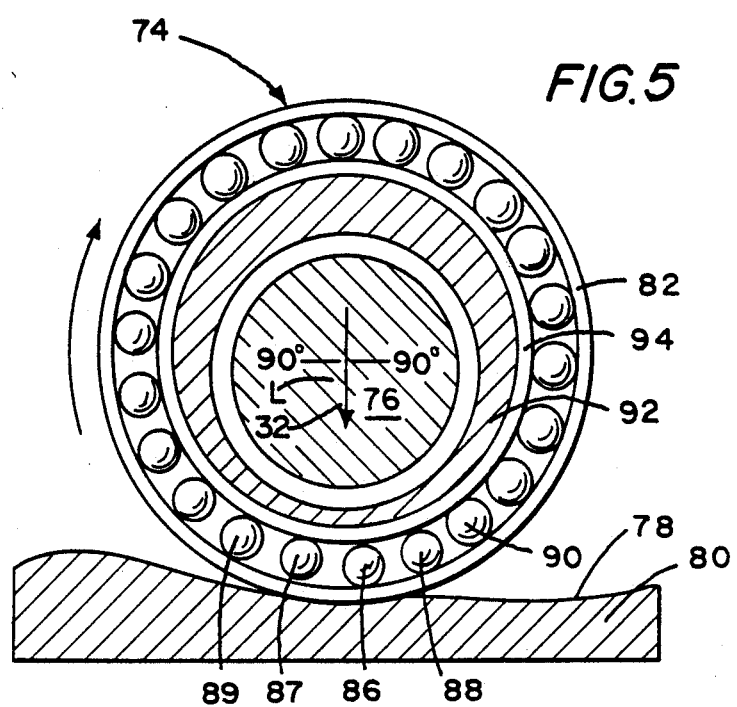
FIG. 5 is a sectional view of another embodiment of the invention in which the inner race is relatively stationary with respect to a radial bearing load and the outer race rotates about its axis with respect to the radial load.

Another preferred embodiment of the invention is shown in FIG. 5. Bearing 74 mounted on shaft 76 generally maintains the same angular position on its axis with respect to a radial bearing load L. The bearing rides on cam surface 78 of cam 80. Annular outer race 82 rotates as the bearing moves over the cam. Race 82 is supported in an upward direction by resistance of cam 80 to the force of load L transmitted in the direction of arrow 32.

When yieldable spacer 92 deforms annular inner race 94, the load is transmitted through rolling member 86 followed by 87, 88 and then 89, 90 and so on, as described earlier. Load concentration on each rolling member at the location of the radial bearing load is reduced considerably by transferring a portion of the load to the adjacent rolling members as far as 45 degrees, and more, arc distance from the location of the radial bearing load to a maximum of 90 degrees each side.

Figure 6:
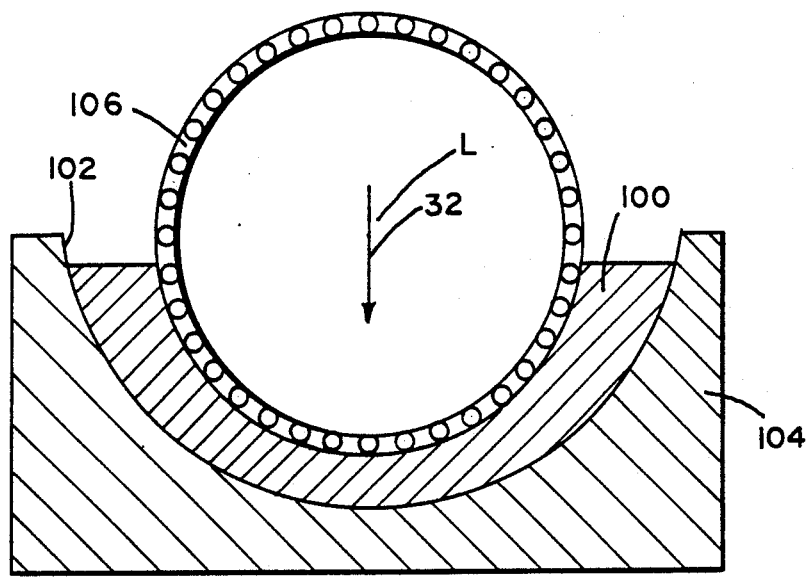
FIG. 6 is a cross-sectional, partial view of a bearing and housing assembly constructed according to another embodiment of the invention in which the outer race is relatively stationary with respect to the radial bearing load and the spacer is in contact with the housing.

In another preferred embodiment shown in FIG. 6, yieldable spacer 100 is located between the inner supporting surface 102 of block 104 and annular outer race 106. Preferably, yieldable spacer 100 is fixedly secured to the block and to the race, to the latter by means which flex as the race deforms without cracking. These securing means such as flexible epoxies are known to the art.

Figure 7:
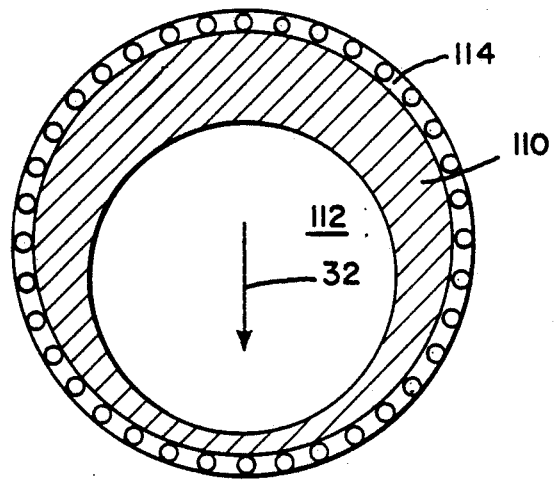
FIG. 7 is a cross-sectional, partial view of a bearing and shaft assembly constructed according to the invention in which the inner race is stationary with respect to the radial bearing load and is in contact with the shaft.
Figure 8:
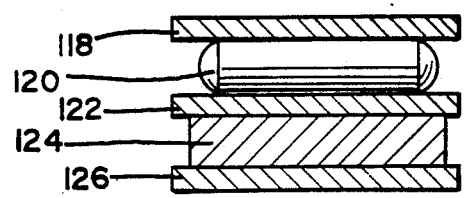
FIG. 8 is a radial cross-sectional, partial view of a bearing according to the present invention.

Another preferred embodiment of the invention is shown in FIG. 7 wherein yieldable spacer 110 is bonded directly to non-rotating shaft 112 and annular inner race 114. Regardless of the rolling member type, be it roller or ball, as shown in FIG. 8, the spacer 124 preferably has a length including that equal to the length of the rolling member 120, as with the races 118 and 122 for uniform load transmission. For most bearing types, the spacer also has a uniform thickness over an axial length equal to the length of the rolling members exemplified by parallel 122 and 126.

When applicable as in an angle bearing, the spacer may include a taper over its axial length without detracting from the performance provided by the present invention.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

I claim:

1. A bearing comprising: an annular outer race; an annular inner race radially spaced from the outer race to provide an outer race—inner race annulus, one of said races being fixed and the other of said races being rotatable; rolling members in the outer race—inner race annulus; and spacer means contacting the fixed race, the spacer means having less stiffness than the fixed race, the thickness of the spacer as a whole increasing with arc distance from the location of the radial bearing load, whereby a portion of the bearing load on rolling members at the location of the bearing load is transferred to adjacent ones of the rolling members.

2. A bearing in accordance with claim 1 wherein: the annular inner race is rotatable.

3. A bearing in accordance with claim 1 wherein: the annular outer race is rotatable.

4. A bearing in accordance with claim 1 wherein: said spacer means has uniform thickness over an axial length equal to the length of and radially aligned with said rolling members.

5. A bearing in accordance with claim 1 wherein: said spacer means varies in the material characteristic of stiffness with arc distance from the location of said radial bearing load for further reducing load concentration on the rolling members at the location of said radial bearing load.

6. A bearing comprising: an annular outer race; an annular inner race; rolling members located between said outer and inner races; a ring; yieldable spacer means, located between said annular inner race and ring in load transmitting communication with said annular inner race and having less stiffness than said annular inner race; said annular outer race being rotatable about its axis with respect to a radial load imposed on the bearing; said ring being relatively stationary about its axis with respect to said radial bearing load; said spacer means increasing in thickness with arc distance from the location of said radial bearing load for reducing load concentration on said rolling members at the location of said radial bearing load by deforming said annular inner race for transferring a portion of said load to adjacent ones of the rolling members.

7. A bearing in accordance with claim 6, further comprising: said spacer means being fixedly secured to said ring.

8. A bearing in accordance with claim 6, further comprising: said spacer means being continuous over said arc distance.

9. A bearing in accordance with claim 8, further comprising: said spacer means fills the entire inner race-ring annulus.

10. A bearing in accordance with claim 6, further comprising: said spacer means having uniform thickness over an axial length equal to and radially aligned with said rolling members.

11. A bearing in accordance with claim 6, further comprising: said spacer means varying in the material characteristic of stiffness with arc distance from the location of said radial bearing load for further reducing load concentration on the rolling members at the location of said radial bearing load by deforming said inner race for transferring a portion of said load to adjacent ones of the rolling members.

12. A bearing comprising: an annular outer race; an annular inner race; rolling members located between said outer and inner races; a ring; yieldable spacer means located between said annular outer race and ring in load transmitting communication with said annular outer race and having less stiffness than said annular outer race; said annular inner race being rotatable about its axis with respect to a radial load imposed on the bearing; said ring being relatively stationary about its axis with respect to said radial bearing load; said spacer means increasing in thickness with arc distance from the location of said radial bearing load for reducing load concentration on the rolling members at the location of said radial bearing load by deforming said annular outer race for transferring a portion of said load to adjacent ones of the rolling members.

13. A bearing in accordance with claim 12, further comprising: said spacer means being fixedly secured to said ring.

14. A bearing in accordance with claim 12, further comprising: said spacer means being continuous over said arc distance.

15. A bearing in accordance with claim 14, further comprising: said spacer means fills the entire outer race-ring annulus.

16. A bearing in accordance with claim 12, further comprising: said spacer means having uniform thickness over an axial length equal to the length and radially aligned with said rolling members.

17. A bearing in accordance with claim 12, further comprising: said spacer means varying in the material characteristic of stiffness with arc distance from the location of said radial bearing load for further reducing load concentration on the rolling members at the location of said radial bearing load by deforming said outer race for transferring a portion of said load to adjacent ones of the rolling members.

18. A bearing and housing assembly comprising: an annular outer race; an annular inner race; rolling members located between said annular outer and annular inner races; a housing for receiving the bearing; yieldable spacer means located between said annular outer race and the housing in load transmitting communication with said outer race and having less stiffness than said outer race; said first ring being rotatable about its axis with respect to a radial load imposed on the bearing; said housing being relatively stationary with respect to said radial bearing load; said spacer means increasing in thickness with arc distance from the location of said radial bearing load for reducing load concentration on the rolling members at the location of said radial bearing load by deforming said outer race for transferring a portion of said load to adjacent ones of the rolling members.

19. A bearing and housing in accordance with claim 18, further comprising: said spacer means being fixedly secured to said housing.

20. A bearing and housing in accordance with claim 18, further comprising: said spacer means being continuous over said arc distance.

21. A bearing and housing in accordance with claim 18, further comprising: said spacer means having uniform thickness over an axial length equal to the length of, and radially aligned with, said rolling members.

22. A bearing and housing in accordance with claim 18, further comprising: said spacer means varying in the material characteristic of stiffness with arc distance from the location of said radial bearing load for further reducing load concentration on the rolling members at the location of said radial bearing load by deforming said outer race for transferring a portion of said load to adjacent ones of the rolling members.

23. A bearing and shaft assembly comprising: an annular outer race; an annular inner race; rolling members located between said annular outer and said annular inner races; a shaft; yieldable spacer means located between said annular inner race and the shaft in load transmitting communication with said annular inner race and having less stiffness than said annular inner race; said annular inner race being rotatable about its axis with respect to a radial load imposed on the bearing; said shaft being relatively stationary about its axis with respect to said radial bearing load; said spacer means increasing in thickness with arc distance from the location of said radial bearing load for reducing load concentration on the rolling members at the location of said radial bearing load by deforming said inner race for transferring a portion of said load to adjacent ones of the rolling members.

24. A bearing and shaft assembly in accordance with claim 23, further comprising: said spacer means being fixedly secured to said shaft.

25. A bearing and shaft assembly in accordance with claim 23, further comprising: said spacer means being continuous over said arc distance.

26. A bearing and shaft assembly in accordance with claim 25, further comprising: said spacer means fills the entire inner race—shaft annulus.

27. A bearing and shaft assembly in accordance with claim 23, further comprising: said spacer means having uniform thickness over an axial length equal to and radially aligned with said rolling members.

28. A bearing and shaft assembly in accordance with claim 23, further comprising: said spacer means varying in the material characteristic of stiffness with arc distance from the location of said radial bearing load for further reducing load concentration on the rolling members at the location of said radial bearing load by deforming said inner race for transferring a portion of said load to adjacent ones of the rolling members.

* * * * *